(12) United States Patent
Ninh et al.

(10) Patent No.: US 10,620,648 B2
(45) Date of Patent: Apr. 14, 2020

(54) SUBSTRATE PROCESSING APPARATUS

(71) Applicant: ASM IP Holding B.V., Almere (NL)

(72) Inventors: Phuc Hong Ninh, Kawasaki (JP); Tsutomu Makino, Inagi (JP)

(73) Assignee: ASM IP Holding B.V., Almere (NL)

( * ) Notice: Subject to any disclaimer, the term of this patent is extended or adjusted under 35 U.S.C. 154(b) by 0 days.

(21) Appl. No.: 16/420,979

(22) Filed: May 23, 2019

(65) Prior Publication Data
US 2019/0346868 A1 Nov. 14, 2019

Related U.S. Application Data

(62) Division of application No. 15/978,725, filed on May 14, 2018, now Pat. No. 10,345,832.

(51) Int. Cl.
*H02M 3/33* (2006.01)
*G05F 1/56* (2006.01)
*H02H 9/02* (2006.01)
*H02M 3/335* (2006.01)

(52) U.S. Cl.
CPC ............... *G05F 1/56* (2013.01); *H02H 9/02* (2013.01); *H02M 3/33515* (2013.01); *H02M 3/33523* (2013.01); *H02M 3/33576* (2013.01)

(58) Field of Classification Search
CPC .......... H01J 37/32082; H01J 37/32174; H01J 37/32192; H01J 37/32715; H01J 37/32798; H02M 3/33515; H02M 3/33523; H02M 3/33576; H02M 1/4225
USPC ............... 315/111.21; 363/16, 89; 323/283
See application file for complete search history.

(56) References Cited

U.S. PATENT DOCUMENTS

| | | | |
|---|---|---|---|
| 5,770,922 A * | 6/1998 | Gerrish | H01J 37/32082 315/111.21 |
| 9,111,718 B2 * | 8/2015 | Merte | H01J 37/32174 |
| 2005/0156583 A1 | 7/2005 | Nachamiev et al. | |
| 2011/0242858 A1 | 10/2011 | Strzalkowski | |
| 2014/0169038 A1 | 6/2014 | Kamath et al. | |
| 2015/0054435 A1 * | 2/2015 | Silitonga | H02P 7/2815 318/400.04 |
| 2015/0098254 A1 | 4/2015 | Brinlee et al. | |
| 2015/0103567 A1 * | 4/2015 | Wang | H02M 3/33592 363/21.13 |
| 2015/0249393 A1 | 9/2015 | Zhang et al. | |
| 2016/0020702 A1 | 1/2016 | Trescases et al. | |
| 2017/0033698 A1 * | 2/2017 | Vemuri | H02M 3/33592 |
| 2017/0099011 A1 | 4/2017 | Freeman et al. | |
| 2018/0323746 A1 * | 11/2018 | Kamath | H04L 25/0268 |

FOREIGN PATENT DOCUMENTS

JP 2013-046142 A 3/2013
JP 2013-172286 A 9/2013

* cited by examiner

*Primary Examiner* — Tung X Le
(74) *Attorney, Agent, or Firm* — Studebaker & Brackett PC

(57) ABSTRACT

Examples of an insulation system include a digital isolator for receiving supply of a first power supply on an input side thereof and receiving supply of a second power supply on an output side thereof, and an output adjusting unit for receiving supply of the second power supply, directly outputting an output of the digital isolator when a voltage of the second power supply is larger than a predetermined voltage, and stopping data output irrespective of the output of the digital isolator when the voltage of the second power supply is smaller or equal to the predetermined voltage.

3 Claims, 10 Drawing Sheets

Truth table of Digital Isolator

| Vin | Vdd1 | Vdd2 | Vo_tmp | Comment |
|---|---|---|---|---|
| L | Powered | Powered | L | Normal Operation |
| H | Powered | Powered | H | Normal Operation |
| L | Unpowered | Powered | L | Fail safe output function |
| X | Powered | Unpowered | Indefinite | Malfunction |

Truth table of output unit

| Input Vo_tmp | Control terminal 14b | Output Vout | Signal Passage |
|---|---|---|---|
| L | L | L | ALLOWED |
| H | L | H | ALLOWED |
| X | H | High-Z | NOT ALLOWED |

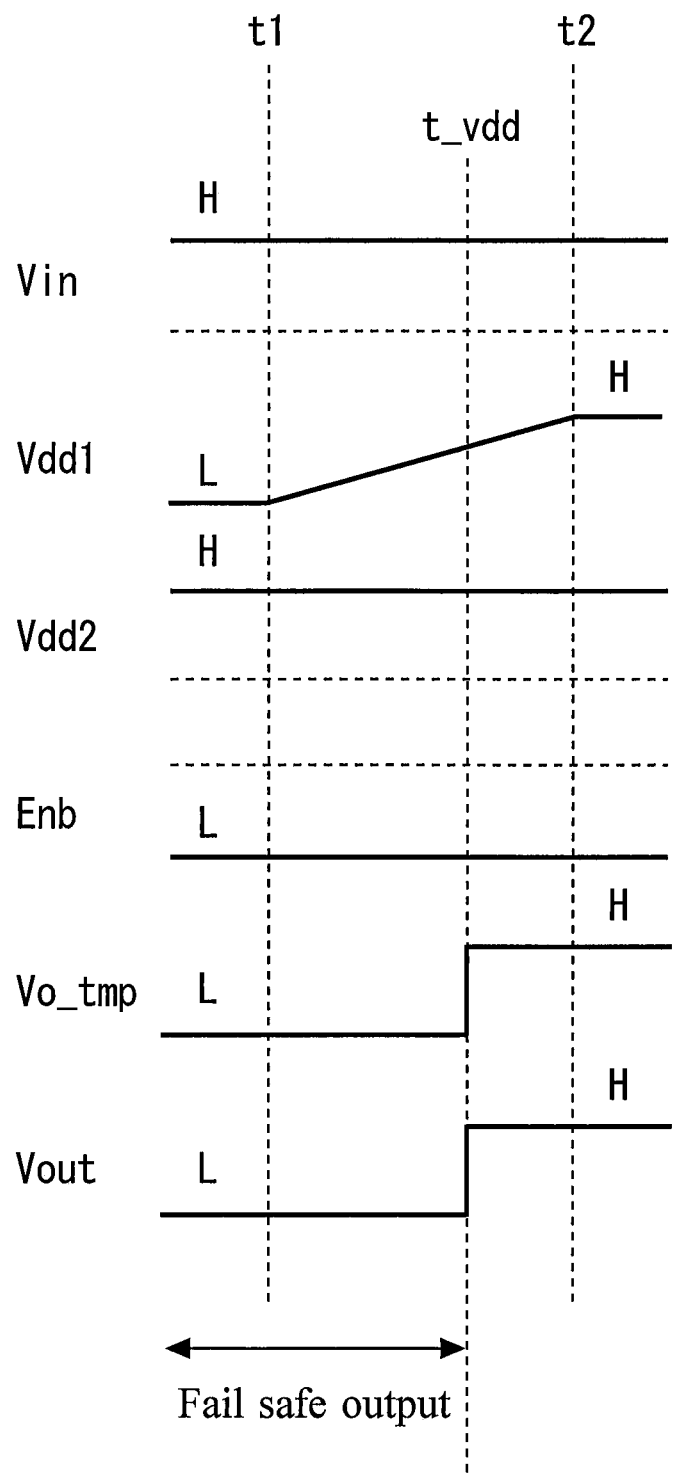

SUBSTRATE PROCESSING APPARATUS

CROSS-REFERENCE TO RELATED APPLICATION

This application is a Divisional of U.S. patent application Ser. No. 15/978,725 filed May 14, 2018, the entire content of which is incorporated herein by reference.

TECHNICAL FIELD

Examples are described which relate to an insulation system and a substrate processing apparatus using the same.

BACKGROUND

At present, a signal insulation method based on a photo-coupler has been widely used in systems requiring electrical insulation such as industrial equipment or medical equipment. However, it has become difficult in systems using photo-couplers to cope with recent high speed operations due to problems such as low data rate, duty ratio deterioration, etc. Therefore, the foregoing method has been replaced by an insulation method using a digital isolator that can solve these problems.

For example, an ADS board is used to control reactor-related AIO, DIO at a cycle of 50 msec. In an ADS board, a photo-coupler is used as an insulating element of DO. When a photo-coupler is used as an insulating element of Fast ADS developed for the purpose of further high-speed driving, a 50% duty ratio of DO cannot be obtained. Therefore, a digital isolator which enables the 50% duty ratio even under high speed driving can be adopted. The output side of the digital isolator may fall into an indefinite state in a power supply unstable state or the like at a power-on time, power cut-off time or the like. Such an indefinite state may impair reliability or safety.

SUMMARY

Some examples described herein may address the above-described problems. Some examples described herein may provide an insulation system and a substrate processing apparatus that can enhance reliability.

In some examples, an insulation system includes a digital isolator for receiving supply of a first power supply on an input side thereof and receiving supply of a second power supply on an output side thereof, and an output adjusting unit for receiving supply of the second power supply, directly outputting an output of the digital isolator when a voltage of the second power supply is larger than a predetermined voltage, and stopping data output irrespective of the output of the digital isolator when the voltage of the second power supply is smaller or equal to the predetermined voltage.

BRIEF DESCRIPTION OF THE DRAWINGS

FIG. 6A is a timing chart showing an example of the operation;

DETAILED DESCRIPTION

Figures 1, 2:
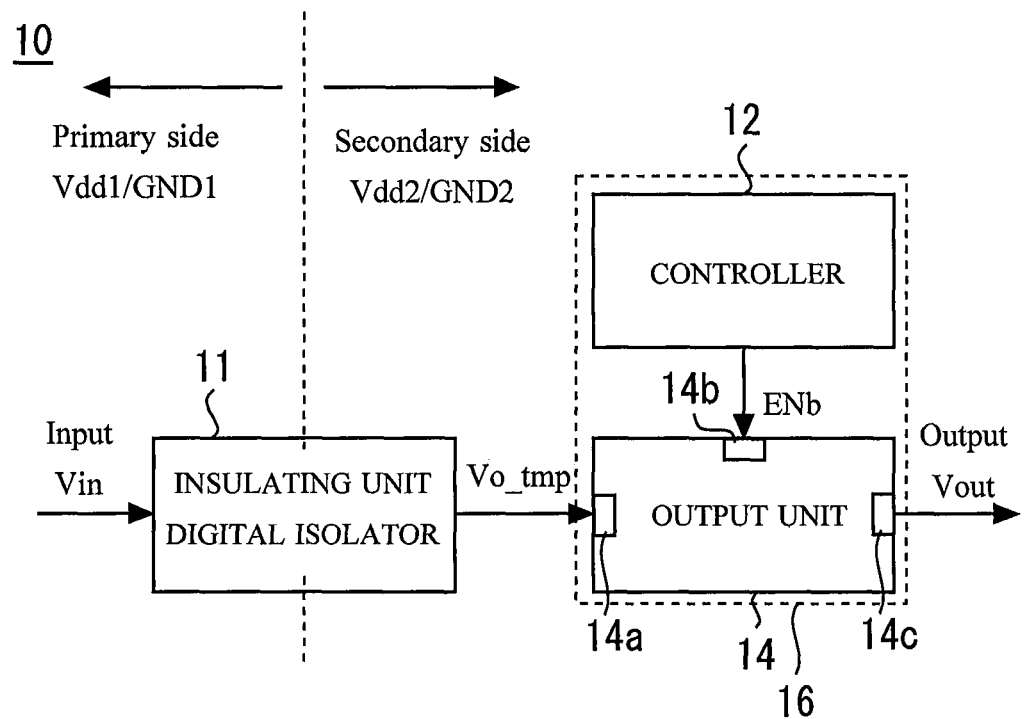
FIG. 1 is a diagram showing an example of an insulation system.
FIG. 2 is a diagram showing an example of a truth table of the digital isolator.

An insulation system and a substrate processing apparatus according to an embodiment will be described with reference to the drawings. The same or corresponding constituent elements are represented by the same reference numerals, and duplicative descriptions thereof may be omitted.

FIG. 1 is a diagram showing an example of an insulation system. The insulation system 10 includes an insulating unit 11 having a digital isolator, an output unit 14 and a controller 12. The respective configurations of these units will be described hereunder.

(1) Insulating Unit 11

In the insulating unit 11, for example, a digital isolator is used as an insulating element between an input and an output. The right and left sides of the insulating unit 11 with respect to a broken line at the center of the insulating unit 11 are electrically insulated from each other, but data communication can be performed between the right and left sides. In a conventional system using a photo-coupler, the data rate may be limited to about 10 Mbps, and also the duty ratio may deteriorate to around 20% due to high-speed operations. On the other hand, the digital isolator can realize a high data rate of, for example, 100 Mbps or more, and an excellent duty ratio of, for example, about 50%. The digital isolator can be configured by one or plural ICs, for example.

This digital isolator receives supply of a first power supply Vdd1 on an input side thereof, and also receives supply of a second power supply Vdd2 on an output side thereof. A ground terminal GND1 on the input side of the digital isolator and a ground terminal GND2 on the output side of the digital isolator are different from each other. FIG. 2 is a diagram showing an example of a truth table of the digital isolator. When power supply by the first power supply Vdd1 and the second power supply Vdd2 is being normally performed, L level is output as an output Vo_Tmp for an input Vin of L level, and H level is output as an output Vo_Tmp for an input Vin of H level.

The digital isolator has, for example, a well-known fail-safe output function, so that the output Vo_Tmp is settled even when the first power supply Vdd1 is cut off. When power supply is not performed by the first power supply Vdd1, but power supply is normally performed by the second power supply Vdd2, in this example, the output Vo_Tmp is fixed to L level, but it may be fixed to H level. On the other hand, when the second power supply Vdd2 is cut off, the output Vo_Tmp falls into an indefinite state.

When the output Vo_Tmp is used while the indefinite state is left, a next-state connection system may malfunction unintentionally, so that reliability and safety may be impaired.

(2) Output Unit 14

As shown in FIG. 1, the output unit 14 has an input terminal 14a, a control terminal 14b and an output terminal 14c. The input terminal 14a is connected to the output of the digital isolator. Accordingly, an input signal of the output unit 14 is an output signal from the insulating unit 11. The control terminal 14b is connected to the controller 12. The control terminal 14b receives, from the controller 12, a signal for determining whether a signal from the input terminal 14a to the output terminal 14c is allowed to pass or not. That is, the control terminal 14b functions as an enable terminal ENb of the output unit 14.

Figures 3, 4:
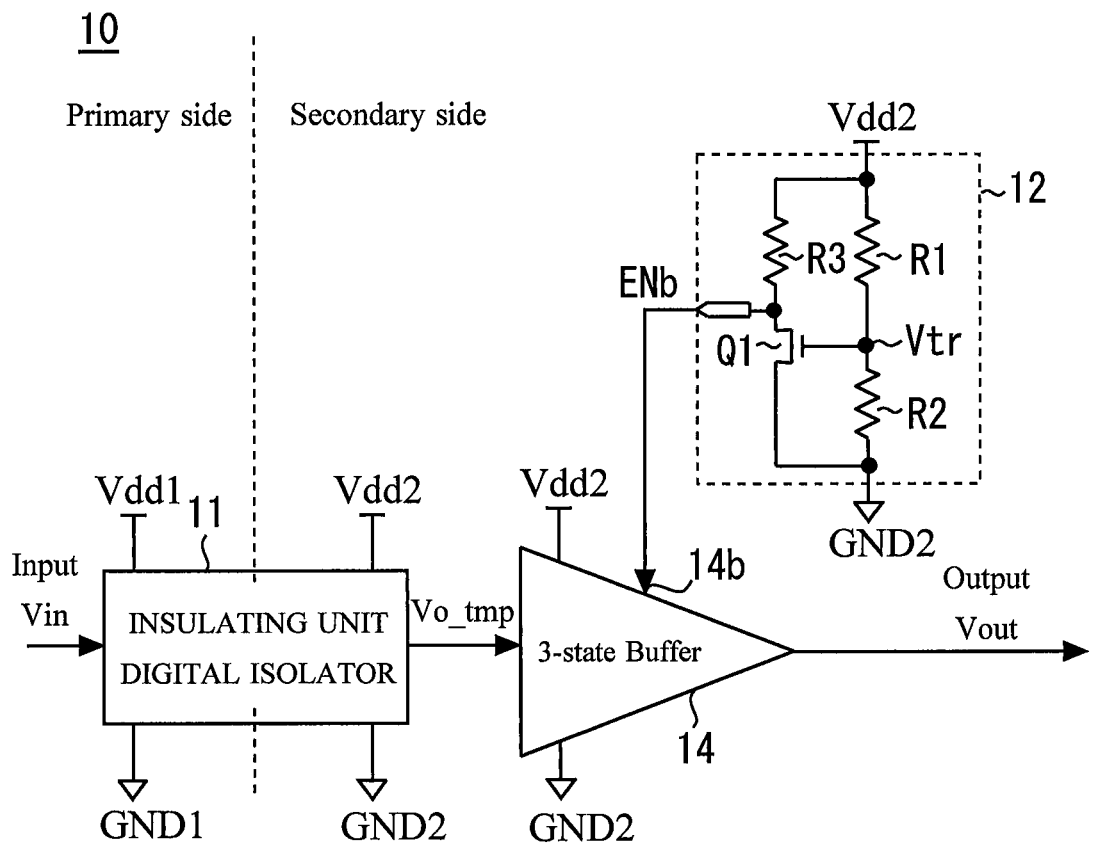
FIG. 3 is a diagram showing an example of a truth table of the output unit.
FIG. 4 is a diagram showing an example of a configuration of the insulation system.

FIG. 3 is a diagram showing an example of a truth table of the output unit 14. When the signal level of the control terminal 14b is L, the output Vo_Tmp is directly output as an output Vout. On the other hand, when the signal level of the control terminal 14b is H, signal passage from the output Vo_Tmp to the output Vout is not allowed, and the output Vout is set to an electrically insulated or high-impedance state. Accordingly, it may be said that this output unit 14 is an output unit having an enable terminal for enabling or disenabling signal passage.

(3) Controller 12

The controller 12 may adopt various configurations for reflecting the voltage state of the second power supply Vdd2 in the control terminal 14b of the output unit 14. The signal level of the control terminal 14b is changed according to whether the voltage of the second power supply Vdd2 is normal or abnormal, whereby it is possible to determine whether the signal passage in the output unit 14 is enabled or disenabled.

The output Vout of the output unit 14 which is an output of the insulation system is settled at all times by the output unit 14 and the controller 12 described above even when the output Vo_Tmp of the insulating unit 11 is in an indefinite state, which prevents malfunction and enhances reliability and safety.

In the insulation system 10 of FIG. 1, the controller 12 and the output unit 14 constitutes an output adjusting unit 16. The output adjusting unit 16 receives supply of the second power source Vdd2. The output adjusting unit directly outputs the output of the digital isolator when the voltage of the second power supply Vdd2 is larger than a predetermined voltage, but stops data output irrespective of the output of the digital isolator when the voltage of the second power supply Vdd2 is smaller or equal to the predetermined voltage. The operation as described above can be realized by various circuit configurations different from the configuration including the controller 12 and the output unit 14 of FIG. 1. For example, dedicated hardware or CPU (which is also called as Central Processing Unit, a central processor, a processing device, a calculation device, a microprocessor, a microcomputer, a processor, DSP or the like) for executing a program stored in a memory may be adopted.

FIG. 4 is a diagram showing an example of a configuration of the insulation system 10. In this example, the output unit 14 is a 3-state buffer. A 3-state buffer circuit is a circuit that can take both of High/Low level states or a high-impedance (Hi-Z) state as the output state. The controller 12 includes a first resistor R1 and a second resistor R2 which are connected in series to the second power supply Vdd2 and the ground terminal GND2. Furthermore, a switching element Q1 having a gate connected to a middle point between the first resistor R1 and the second resistor R2 is provided. A middle point between the second power supply Vdd2 and the first resistor R1, and the drain of the switching element Q1 are connected to each other by a third resistor R3. The source of the switching element Q1 is connected to the ground terminal GND2.

The controller 12 illustrated in FIG. 4 switches the connection of the control terminal 14b to the second power supply Vdd2 or the ground terminal GND2 according to the state of the second power supply Vdd2. That is, the control terminal 14b is set to an H-level state or an L-level state. The controller 12 illustrated in FIG. 4 is configured so that when the voltage of the second power supply Vdd2 becomes larger than a predetermined voltage, the switching element Q1 is turned on to connect the ground terminal GND2 to the control terminal 14b, whereas when the voltage of the second power supply Vdd2 becomes smaller or equal to the predetermined value, the switching element Q1 is turned off to connect the control terminal 14b to the second power supply Vdd2 via a resistor. More specifically, when the second power supply Vdd2 is surely powered, the switching element Q1 is turned on with a voltage Vtr divided by the first and second resistors R1 and R2, and the output is connected to the ground terminal GND2. On the other hand, when the second power supply Vdd2 is in an unpowered state, a power-on transient state or a cut-off transient state and thus a voltage is not normally supplied, the output of the controller 12 is connected to the second power supply Vdd2 via the third resistor R3.

Next, an example of the operation of the insulation system 10 illustrated in FIG. 4 will be described.

Figure 5:
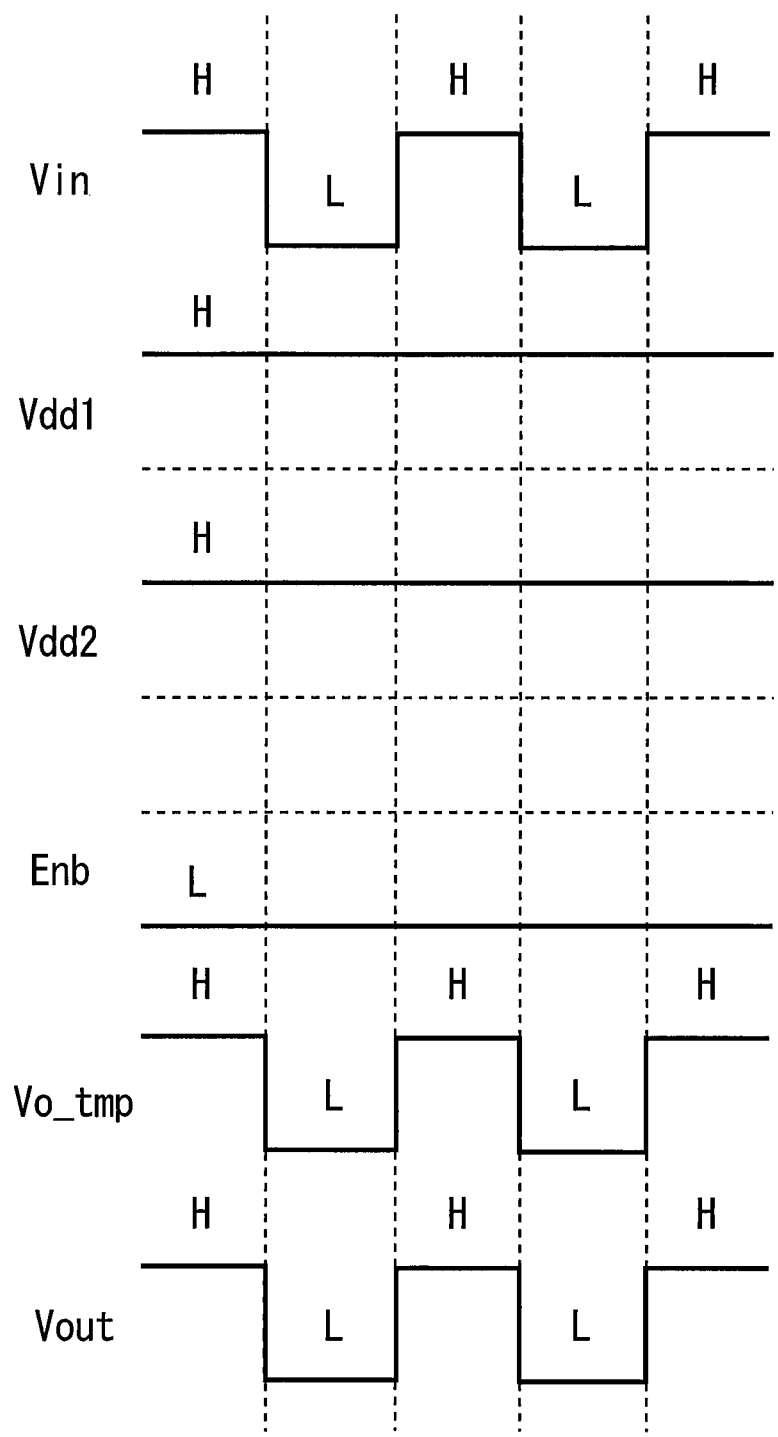
FIG. 5 is a timing chart showing an example of the operation.

(A) Normal Operation FIG. 5 is a timing chart showing an example of the normal operation. When both the first power supply Vdd1 and the second power supply Vdd2 are normally powered, a signal is transmitted from the input Vin to the output Vout at a high data rate and an excellent duty ratio. At this time, the switching element Q1 is turned on, and the control terminal 14b is connected to the ground terminal GND2.

(B) When First Power Supply Vdd1 is Indefinite

FIG. 6A is a timing chart showing an example of the operation when the first power supply Vdd1 is indefinite at the power-on time. The first power supply Vdd1 is unpowered during the period from the left end till a time t1 in FIG. 6A. The output Vout is fixed by the fail-safe output function of the digital isolator. In this example, the output Vout is fixed to L level.

The period from the time t1 to t2 in FIG. 6A is a transient period during which the first power supply Vdd1 transitions from the L level to the H level. At the initial time of this period, the output Vout is fixed to L level by the fail-safe output function in the same as the unpowered period. When a time t_vdd has come, the voltage of the first power supply Vdd1 reaches the operation voltage of the digital isolator, and the operation is switched to the normal operation. At this time, the state of the input Vin is output from the output Vout.

Figure 6B:
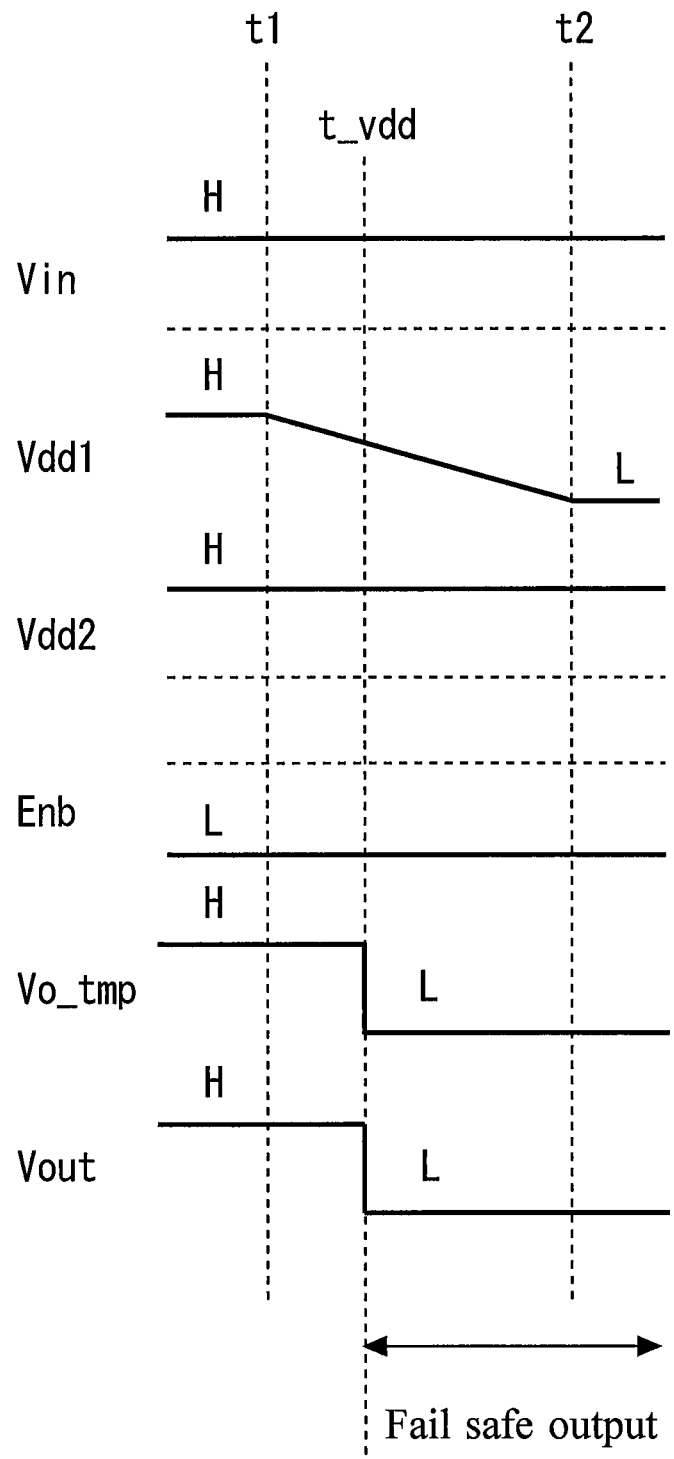
FIG. 6B is a timing chart showing an example of the operation.

The period from the time t2 to the right end in FIG. 6A is a period during which the first power supply Vdd1 normally supplies power. In this period, the signal of the input Vin is output from the output Vout. The operation at the power-on time of the first power supply Vdd1 has been described with reference to FIG. 6A. FIG. 6B is a timing chart showing an operation when the first power supply Vdd1 is cut off. The operation at the cut-off time corresponds to an operation obtained by reversely progressing the operation at the power-on time. That is, when the time has passed the time t1 and reached the time t_vdd, the voltage of the first power supply Vdd1 decreases to the operation voltage of the digital isolator, and at this timing, the output Vout is fixed to the L level by the fail-safe output function.

(C) When Second Power Supply Vdd2 is Indefinite

Figure 7A:
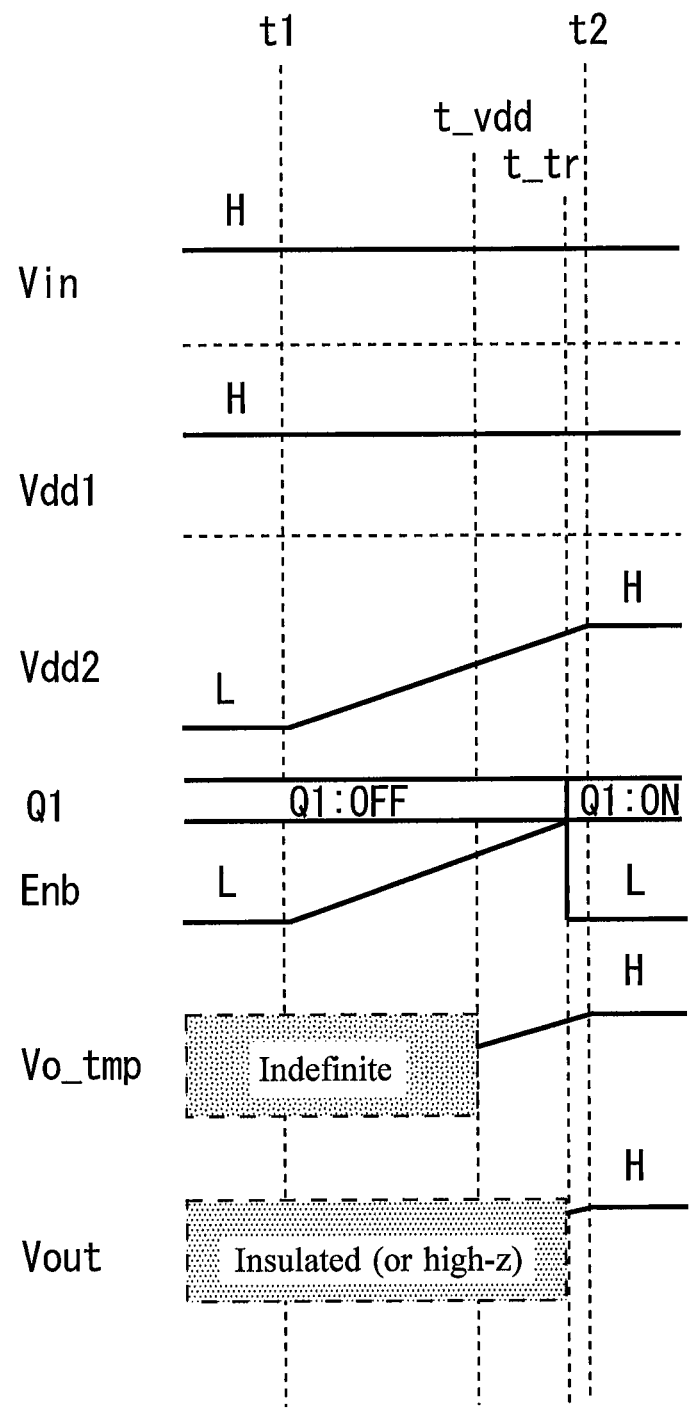
FIG. 7A is a timing chart showing an example of the operation.

FIG. 7A is a timing chart showing an example of the operation when the second power supply Vdd2 is indefinite at the power-on time. During the period from the left end to a time t1 in FIG. 7A, the second power supply Vdd2 is unpowered. In this period, the output Vo_tmp of the digital isolator has fallen into an indefinite state as shown in the truth table of FIG. 2. In this case, in the controller 12 of FIG. 4, Vtr divided from the second power supply Vdd2 is also unpowered, so that the switching element Q1 is turned off. As a result, the control terminal 14b is connected to the second power source Vdd2 via the third resistor R3, and likewise unpowered. Accordingly, the control terminal 14b is set to the H level, and the output Vout is set to an electrically insulated or high-impedance state. Under the insulated or high-impedance state, the output Vout is neither High nor Low, and set to substantially the same state as if it is separated from an output circuit inside an output terminal.

The period from the time t1 to the time t2 in FIG. 7A is a transient period during which the second power supply Vdd2 transitions from the L level to the H level. At the initial time of this period, that is, from the time t1 till the time t_vdd at which the voltage of the second power supply Vdd2 has reached the operation voltage of the digital isolator, the voltage of the second power supply Vdd2 increases, but the indefinite state of the output Vo_tmp continues as in the case of the unpowered state. In the controller 12, Vtr increases according to the increase of the second power supply Vdd2, but is smaller than a threshold value of the switching element Q1, so that the switching element Q1 maintains an off-state. Accordingly, the output Vout maintains the electrically insulated or high-impedance state.

When the time has reached the time t_vdd and the voltage of the second power supply Vdd2 becomes larger than the operation voltage of the digital isolator, the state of the input Vin is output from the output Vo_tmp. When the input Vin is at the H level, the output Vo_tmp increases as in the case of the voltage of the second power supply Vdd2. However, by setting the threshold value where the switching element Q1 switches state to be larger than the operation voltage of the digital isolator, the switching element Q1 is kept in an off-state for a while after the time has reached the time t_vdd. Accordingly, the output Vout maintains the electrical insulation or high-impedance for a certain period after the time has reached the time t_vdd.

Thereafter, when the time t_tr has come, Vtr becomes larger than the threshold value of the switching element Q1, and the switching element Q1 is turned on. As a result, the control terminal 14b is connected to the ground terminal GND2, and the state of the output Vo_tmp is output to the output Vout. That is, the input Vin is output to the output Vout. Thereafter, when the time t2 has come, the voltage of the second power supply Vdd2 has reached the H level. During a period subsequent to the time t2, the signal is transmitted from the input Vin to the output Vout.

As described above, the insulated or high-impedance state of the Vout is not released immediately after the time has reached the time t_vdd and the indefinite state of the output Vo_tmp has been dissolved, but the switching element Q1 is turned on after a certain period has elapsed from the time t_vdd and the time t_tr has come. By the processing as described above, the insulated or high-impedance state of Vout can be prevented from being released under the indefinite state of the output Vo_tmp even when the indefinite state of the output Vo_tmp is extended a little due to fluctuation of the operation.

Figure 7B:
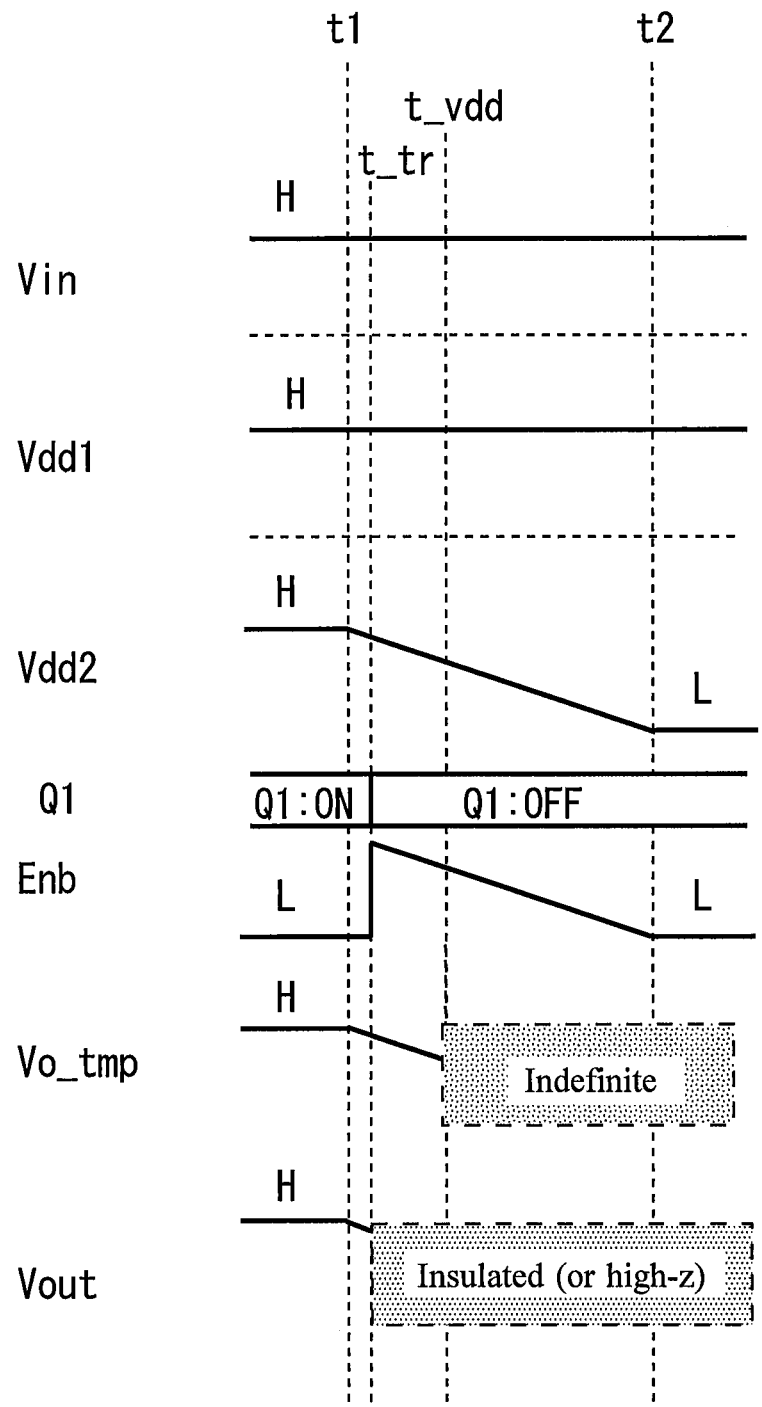
FIG. 7B is a timing chart showing an example of the operation.

The operation at the time of the second power supply Vdd2 is turned on has been described with reference to FIG. 7A. FIG. 7B is a timing chart showing the operation when the second power supply Vdd2 is cut off. The operation at the cut-off time corresponds to an operation obtained by reversely progressing the operation at the power-on time. That is, when the time has passed the time t1 and reached the time t_tr, the output Vout is set to an electrically insulated or high-impedance state. Thereafter, when the time has reached the time t_vdd and the voltage of the second power supply Vdd2 has decreased to the operation voltage of the digital isolator, the output Vo_tmp falls into an indefinite state.

According to the operation described in the foregoing (A) to (C), the output Vout of the insulation system 10 has been never set to an indefinite state, and the state thereof is always settled, and in particular, the insulation system 10 falls into an insulated state without outputting unless the second power supply Vdd2 is substantially surely powered. Therefore, the malfunction can be prevented, and reliability and safety can be enhanced. Furthermore, not only at the power-on time and the power cut-off time, but also when another abnormality such as instantaneous voltage drop or the like occurs in the second power supply Vdd2, it is expected that they can be dealt with.

Figure 8:
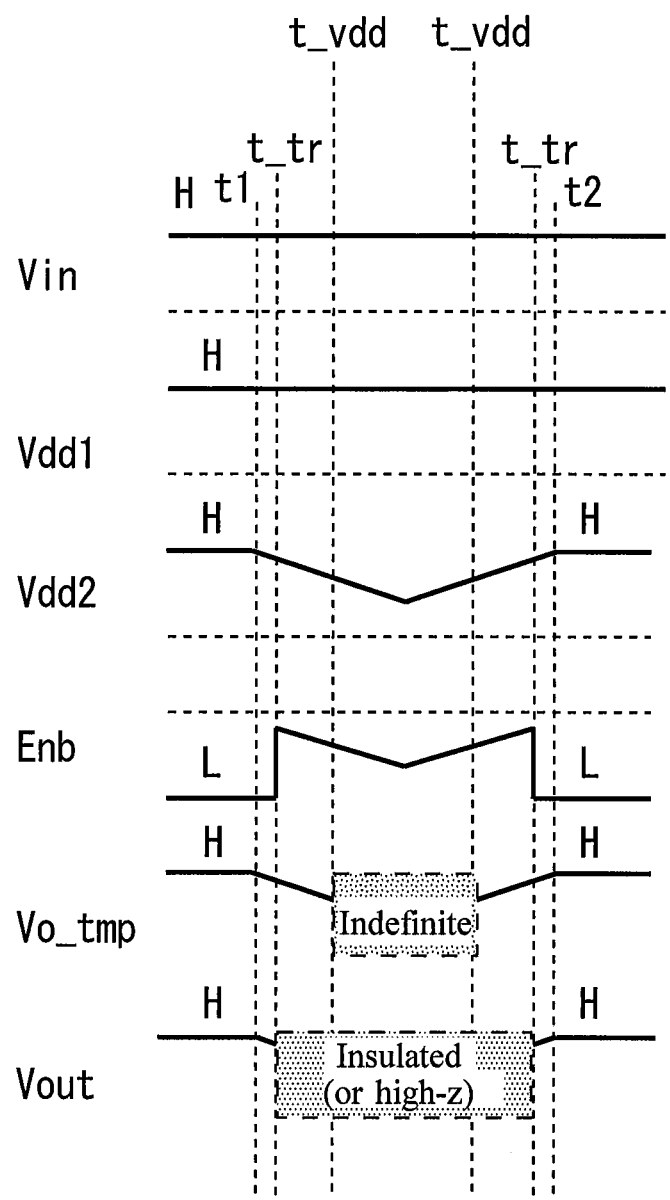
FIG. 8 is a timing chart showing an example of the operation.

FIG. 8 is a diagram showing an example of the operation when instantaneous voltage drop occurs in the second power supply Vdd2. Vo_tmp falls into the indefinite state from the time t_vdd till the next time t_vdd, but the reliability of the insulation system may be enhanced by setting the output Vout to the insulated or high-impedance state before the period begins and after the period ends.

Figure 9:
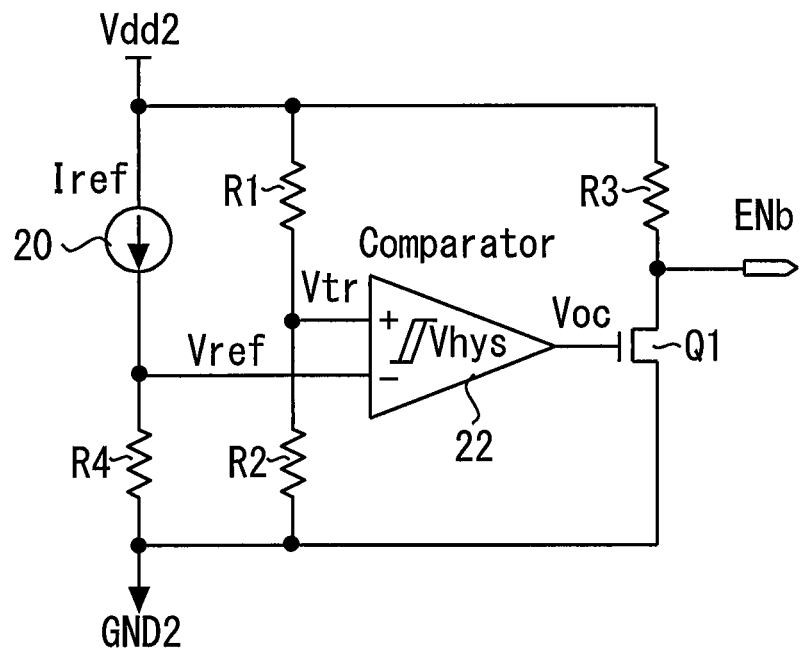
FIG. 9 is a diagram showing an example of the controller.
Figure 10:
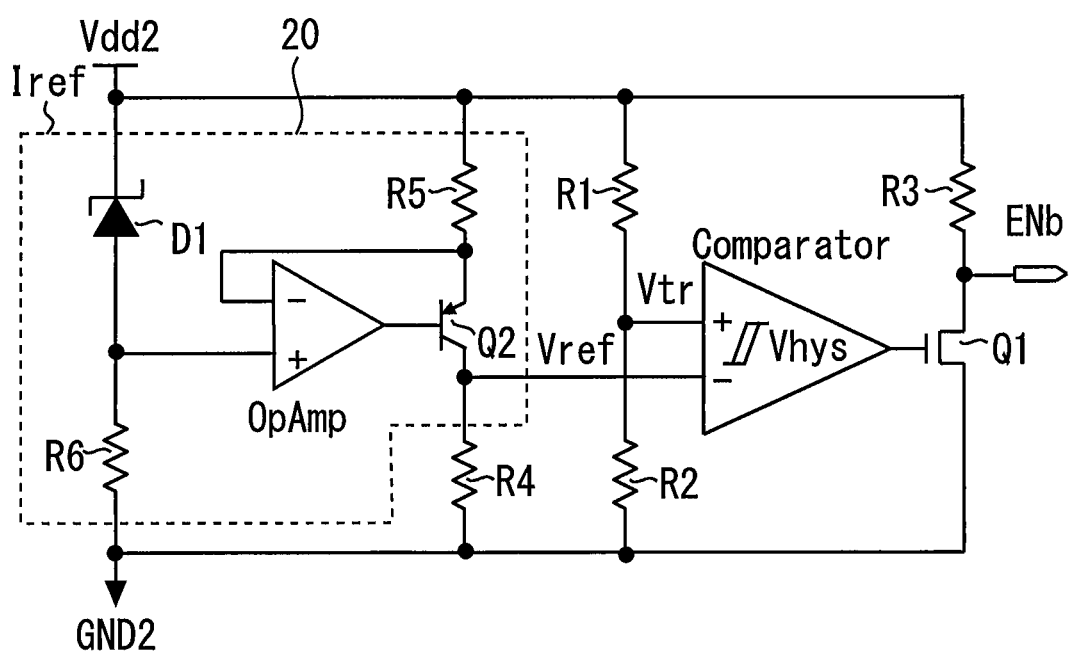
FIG. 10 is a diagram showing an example of a configuration of the constant current circuit.

FIG. 9 is a diagram showing another example of the circuit of the controller 12. The controller 12 of FIG. 9 prevents chattering to stabilize the operation. This controller 12 has a constant current circuit 20 connected to the second power supply Vdd2. The output of the constant current circuit 20 is input as Vref to a negative-side input of a comparator 22. Vtr is applied to a positive-side input of the comparator 22. The output of the comparator 22 is connected to the gate of the switching element Q1. FIG. 10 is a diagram showing an example of a configuration of the constant current circuit 20 of FIG. 9. As shown in FIG. 10, the constant current circuit 20 may be configured by using an operational amplifier.

Vtr and Vref may be given by the following expressions.

$Vtr = Vdd2 \times R2/(R1+R2)$ $Vref = Iref \times R4$

At the power-on time of the second power supply Vdd2, when Vtr>Vref+Vhys is satisfied, the output Voc of the comparator 22 is set to H level, and the switching element Q1 is turned on. As a result, the output unit 14 outputs the output Vo_temp from the output Vout.

On the other hand, at the power cut-off time of the second power supply Vdd2, when Vtr<Vref−Vhys is satisfied, the output Voc of the comparator 22 is set to L level, and the switching element Q1 is turned off. As a result, the output Vout is set to the insulated or high-impedance state.

Figure 11:
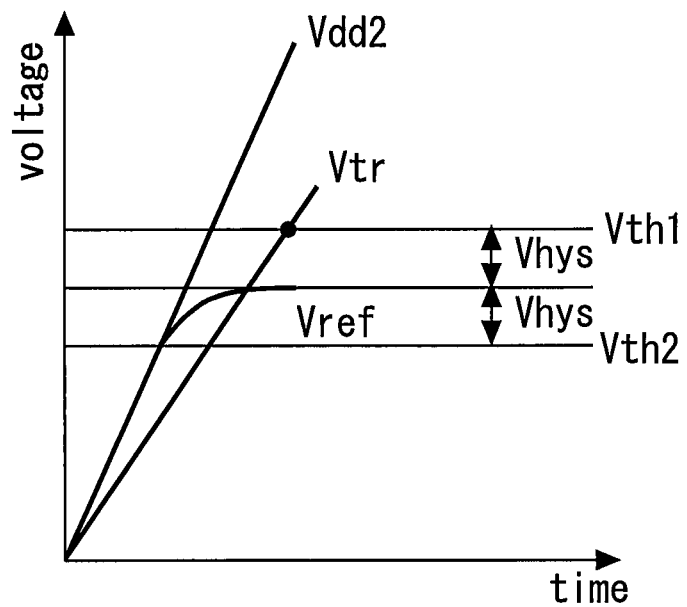
FIG. 11 is a diagram showing a voltage waveform at the power-on time.

FIG. 11 is a diagram showing a voltage waveform at the power-on time. When the voltage of the second power supply Vdd2 increases, increase of Vref stops, and converges to a certain value. However, Vtr continues to increase. When Vtr reaches a threshold value Vth1 represented by Vref+Vhys, the comparator 22 turns on the switching element Q1. On the other hand, when the voltage of the second power supply Vdd2 decreases, the decrease of Vref stops, and converges to a certain value. However, Vtr continues to decrease. When Vtr reaches a threshold value Vth2 represented by Vref-Vhys, the comparator 22 turns off the switching element Q1.

Accordingly, the controller 12 of FIGS. 9 and 10 connects the control terminal 14b to the ground when the voltage of the second power supply Vdd2 becomes larger than a predetermined first threshold value, and connects the control terminal 14b to the second power supply Vdd2 via a resistor when the voltage of the second power supply Vdd2 becomes smaller than a second threshold value smaller than the first threshold value. The switching element Q1 is controlled by using the different threshold values at the power-on time and the power cut-off time respectively, which prevents chattering to stabilize the operation for example when the second power supply Vdd2 fluctuates or the like.

Figure 12:
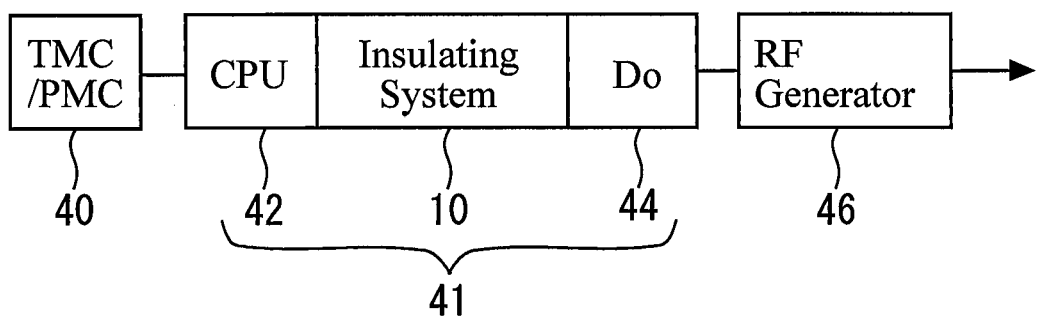
FIG. 12 is a diagram showing an example of the substrate processing apparatus.

FIG. 12 is a diagram showing an example of the substrate processing apparatus. The substrate processing apparatus includes a module controller 40, an IO board 41, and a device 46. The module controller 40 is, for example, Transfer Module Controller (TMC) or Process Module Controller (PMC). The IO board 41 receives an instruction from the module controller 40, and controls the device 46. The IO board 41 is configured by connecting CPU 42 and DO (Digital Output) circuit 44 via the insulation system 10. The insulation system 10 is an insulation system having any configuration described above. The first power supply Vdd1 and the ground terminal GND1 are used at CPU 42 and the primary side of the digital isolator, and the second power supply Vdd2 and the ground terminal GND2 are used at the DO circuit 44 and the secondary side of the digital isolator.

The device 46 corresponds to various devices operating based on an instruction from the IO board 41. For example, the device 46 is a gas supply device for supplying gas to a substrate. In this case, ON/OFF of the gas supply device is controlled based on an instruction from the IO board 41.

The device 46 may be, for example, an RF generator for subjecting a substrate to plasma processing. In this case, ON/OFF of the RF generator is controlled based on an instruction from the IO board 41. Another device used for substrate processing or the like may be used as the device 46. Highly-reliable control having no indefinite state can be realized by the insulation system 10 described above.

The invention claimed is:

1. A substrate processing apparatus comprising:
a module controller;
an IO board configured to receive an instruction from the module controller; and
a device configured to operate based on an instruction from the IO board, wherein the IO board includes a digital isolator configured to receive supply of a first power supply on an input side of the digital isolator and configured to receive supply of a second power supply on an output side of the digital isolator, and an output adjusting unit configured to receive supply of the second power supply, configured to directly output an output of the digital isolator when a voltage of the second power supply is larger than a predetermined voltage, and configured to stop data output irrespective of the output of the digital isolator when the voltage of the second power supply is smaller or equal to the predetermined voltage.

2. The substrate processing apparatus according to claim 1, wherein the device is a gas supply device configured to supply gas to a substrate, and ON/OFF of the gas supply device is controlled based on an instruction from the IO board.

3. The substrate processing apparatus according to claim 1, wherein the device is an RF generator configured to subject a substrate to plasma processing, and ON/OFF of the RF generator is controlled based on an instruction from the IO board.

* * * * *